(12) United States Patent
Bouvet et al.

(10) Patent No.: US 7,489,748 B2
(45) Date of Patent: Feb. 10, 2009

(54) METHOD FOR THE RECEPTION OF A SIGNAL THAT HAS UNDERGONE A LINEAR PRECODING AND A CHANNEL CODING, CORRESPONDING RECEPTION DEVICE AND COMPUTER PROGRAM PRODUCT

(75) Inventors: Pierre-Jean Bouvet, Rennes (FR); Maryline Helard, Rennes (FR); Vincent Le Nir, Flers (FR)

(73) Assignee: France Telecom, Paris (FR)

( * ) Notice: Subject to any disclaimer, the term of this patent is extended or adjusted under 35 U.S.C. 154(b) by 594 days.

(21) Appl. No.: 11/143,151

(22) Filed: Jun. 2, 2005

(65) Prior Publication Data

US 2005/0281357 A1    Dec. 22, 2005

(30) Foreign Application Priority Data

Jun. 4, 2004    (EP)    ................................. 04364041

(51) Int. Cl.
     *H04L 1/00*      (2006.01)
     *H04L 25/08*      (2006.01)
     *H04B 1/10*      (2006.01)
     *H03D 1/06*      (2006.01)

(52) U.S. Cl. ...................................... 375/346; 375/267

(58) Field of Classification Search ......... 375/130–131, 375/140–144, 147–149, 260, 267, 316, 340–341, 375/346–347, 324

See application file for complete search history.

(56) References Cited

U.S. PATENT DOCUMENTS

| | | | | |
|---|---|---|---|---|
| 6,865,237 | B1 * | 3/2005 | Boariu et al. ............... | 375/295 |
| 2005/0041751 | A1 | 2/2005 | Nir et al. .................... | 375/267 |
| 2007/0165696 | A1 * | 7/2007 | Agrawal ..................... | 375/136 |
| 2007/0223411 | A1 * | 9/2007 | Rooyen et al. .............. | 370/310 |
| 2007/0242179 | A1 * | 10/2007 | Song et al. .................... | 349/43 |
| 2008/0013638 | A1 * | 1/2008 | Walton et al. ............... | 375/260 |

FOREIGN PATENT DOCUMENTS

EP      1335518 A1      8/2003

OTHER PUBLICATIONS

M. Debbah, P. Loubaton & M. de Courville, "The Spectral Efficiency of Linear Precoders", 2003 IEEE Information Theory Workshop, Mar. 31, 2003 to Apr. 4, 2003, pp. 90-93.

(Continued)

*Primary Examiner*—Chieh M. Fan
*Assistant Examiner*—Freshteh N Aghdam
(74) *Attorney, Agent, or Firm*—Westman, Champlin & Kelly, P.A.

(57) ABSTRACT

A method for the reception of a data signal which, before being sent, has undergone a linear precoding by means of a unitary preceding matrix, and a channel coding, comprises at least one iteration to improve an estimation of the received signal, as a function of the received signal and of a preceding estimation of the received signal. This iteration comprises the following steps: the estimation of the interference due especially to the linear precoding and affecting the received signal, as a function of the preceding estimation, so as to obtain an estimated interference; the subtraction of the estimated interference from the preliminarily filtered and de-precoded received signal, so as to obtain an improved signal; the equalization of the improved signal, delivering an equalized signal; the estimation of the received signal, delivering an estimation of the received signal.

14 Claims, 7 Drawing Sheets

OTHER PUBLICATIONS

Y. Xin, X. Liu and G. B. Giannakis, "High-Rate Layered Space-Time Transmissions based on Constellation-Rotation," 2002 IEEE Wireless Comm. and Networking Conference, vol. 1, Mar. 17, 2002, pp. 471-476.

J. Boutros and E. Viterbo, "Signal Space Diversity: A Power- and Bandwidth-Efficient Diversity Technique for the Rayleigh Fading Channel," IEEE Trans. Comm. vol. 44, No. 4, Jul. 1998, pp. 1453-1467.

A. Stamoulis, Z. Liu and G. Biannakis, "Space-Time Block-Coded OFDMA With Linear Precoding for Multirate Services," IEEE Transacation on Signal Processing, vol. 50, No. 1, Jan. 2002. pp. 119-129.

J. Boutros, N. Gresset and L. Brunel, "Turbo Coding and Decoding for Multiple Antenna Channels," Internat'l Symposium on Turbo Codes and Related Topics, Sep. 2003, pp. 1-7.

Z. Wang, S. Zhou and G. Giannakis, "Joint Coding-Precoding with Low-Complexity Turbo-Decoding," IEEE Transaction of Wireless Communications, vol. XXX, No. XXX, Month 2003, pp. 1-11, Mar. 2003.

* cited by examiner

Fig. 10C ns that have undergone, at the time of sending, channel coding and linear precoding, showing greater performance than the prior art techniques, and especially than those based on the techniques of decoding by maximum likelihood.

METHOD FOR THE RECEPTION OF A SIGNAL THAT HAS UNDERGONE A LINEAR PRECODING AND A CHANNEL CODING, CORRESPONDING RECEPTION DEVICE AND COMPUTER PROGRAM PRODUCT

FIELD OF THE INVENTION

The field of the invention is that of digital communications systems. More specifically, the invention relates to the reception of signals, received by means of one or more transmission channels.

More specifically again, the invention relates to an iterative technique for the reception of a signal that has undergone, at the time of sending, a channel coding operation and a linear precoding operation.

The invention relates especially to digital wire communications systems (such as the ADSL, or "asymmetric digital subscriber line") as well as wireless communications systems having one or more sending and/or receiver antennas.

The invention has especially a reception technique adapted to multicarrier systems such as the OFDM (Orthogonal Frequency Division Multiplexing) or the MC-CDMA (Multi-Carrier Code Division Multiplex Access) systems and as well as single-carrier systems that has undergone linear precoding.

BACKGROUND OF THE INVENTION

There exist different types of receivers for such systems having undergone linear precoding in sending mode.

Figure 1:
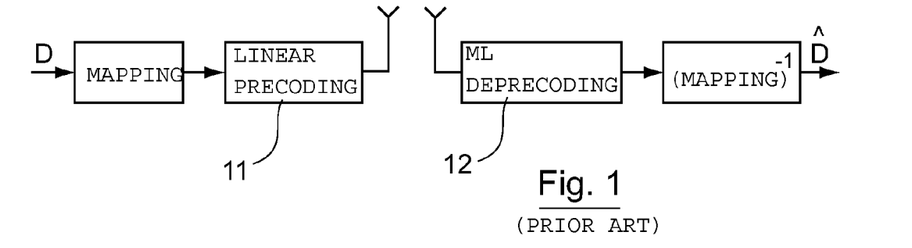
FIGS. 1 and 2, already commented upon with reference to the prior art present a chain of transmission of a linearly precoded signal.

Thus, J. J. Boutros and E. Viterbo ("Signal space diversity, a power and bandwidth-efficient diversity technique for the Rayleigh fading channel", *IEEE Trans. Commun.*, vol. 44, no. 4, pp. 1453-1467, July 1998) propose a signal space diversity technique, illustrated in FIG. 1, also called linear precoding 11, and demonstrates the fact that multidimensional rotation sending constellations augment this diversity without increasing the bandwidth of the signal. For Rayleigh type fading channels, this augmentation of diversity is expressed by an improvement of performance at reception. However, such a system necessitates the implementation of a maximum likelihood (ML) type receiver 12.

One drawback of these maximum likelihood type receivers is the complexity of their implementation. Indeed, the complexity of the algorithms increases exponentially as a function of the number of antennas and the number of states of the modulation.

A. Stamoulis, Z. Liu and G. B. Giannakis, in "Space-time block-coded OFDMA with linear precoding for multirate services" (*IEEE Trans. Signal Processing*, vol. 50, no. 1, pp. 119-129, January 2002), and V. Le Nir, M. Hélard and R. Le Gouable, in "Technique de précodage et de codage espace-temps" (Space-time precoding and encoding technique), patent application number FR 02 16200, filed on 16 Dec. 2002 on behalf of the present applicant) propose the association of the linear precoding with space-time block codes with a view to MIMO ("Multiple Input Multiple Output") type transmission.

Figure 2:
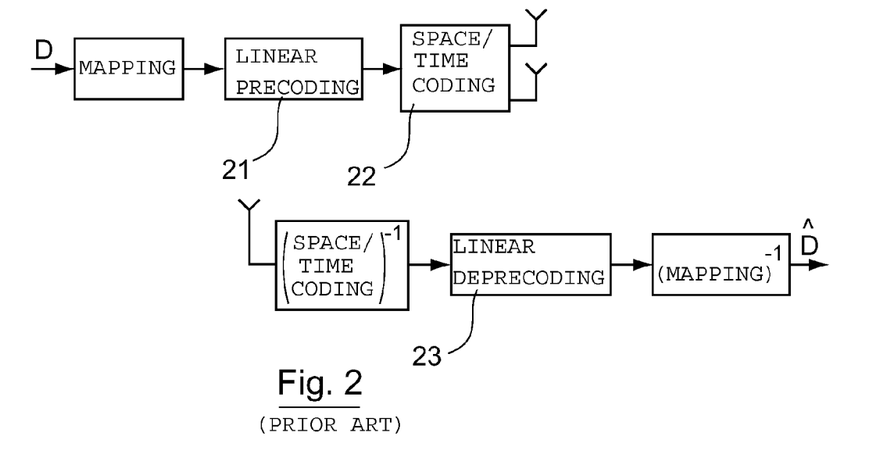

In particular, as illustrated in FIG. 2, V. Le Nir et al. propose the use of precoding matrices 21 which, combined with orthogonal space-time codes 22 before sending, allow linear decoding 23 in reception, simplifying the implementation of the receiver.

One drawback of these prior art techniques is that they are not optimal in the presence of channel coding, owing to a vestigial interference after "de-precoding". Indeed, whatever may be the decoding algorithm used (whether of the maximum likelihood or linear type), this vestigial interference is not eliminated.

The term "de-precoding" here and throughout the rest of the document is understood to mean an operation that is substantially the reverse of the precoding operation performed at the time of sending.

Very recently, iterative techniques for the reception of a linearly pre-coded signal have appeared. The techniques improve performance at reception, when a channel coding is implemented in sending mode.

Thus, J. J. Boutros, N. Bresset and L. Brunel ("Turbo coding and decoding for multiple antenna channels", *International Symposium on Turbo Codes and Related topics*, Brest, France, September 2003) have introduced a system, presented in FIG. 3, implementing linear precoding associated with space-time bit-interleaved coded modulation (ST-BICM) in a MIMO transmission. The system consists of the concatenation of a channel coder 31, an interleaver 32, a converter of binary elements into symbols 33 (also called a mapper), enabling the demultiplexing of the symbols on the different sending or transmit antennas and as well as the precoder 34 acting both in the time domain and the space domain.

Figure 3:
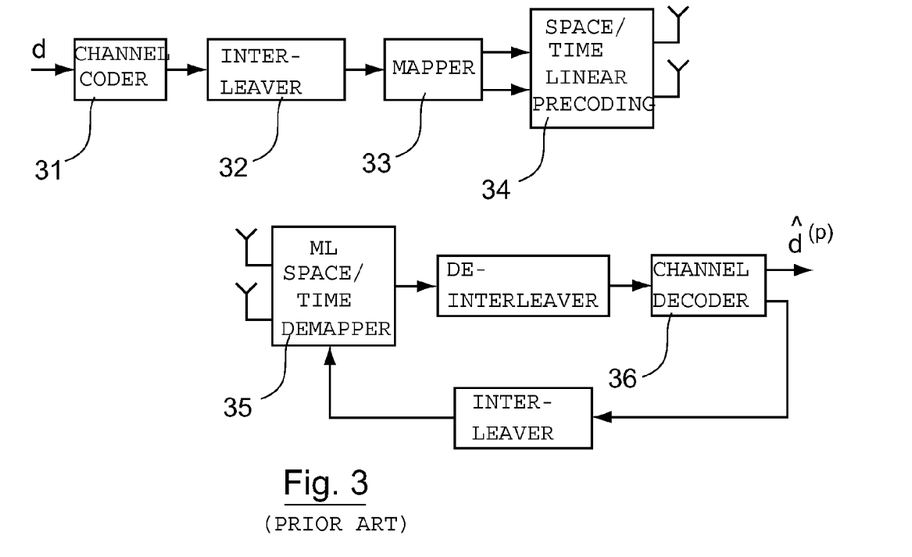
FIGS. 3 and 4, also commented upon with reference to the prior art, present a chain of transmission of a linearly precoded signal after channel coding, implementing an iterative reception technique enabling the partial elimination of the interference due to the channel coding.

At reception, the system implements a space-time demapper 35 using an ML type algorithm, analyzing especially the LLR ("log likelihood ratios") on each coded bit. A demapper of this kind implements an operation that is substantially the reverse of that of the mapper. These likelihood ratios are improved through a SOVA (soft output Viterbi algorithm) type of channel decoder 36 and sent again to the demapper 35. This process is reiterated in order to improve the decoded data $\hat{d}^{(p)}$.

Figure 4:
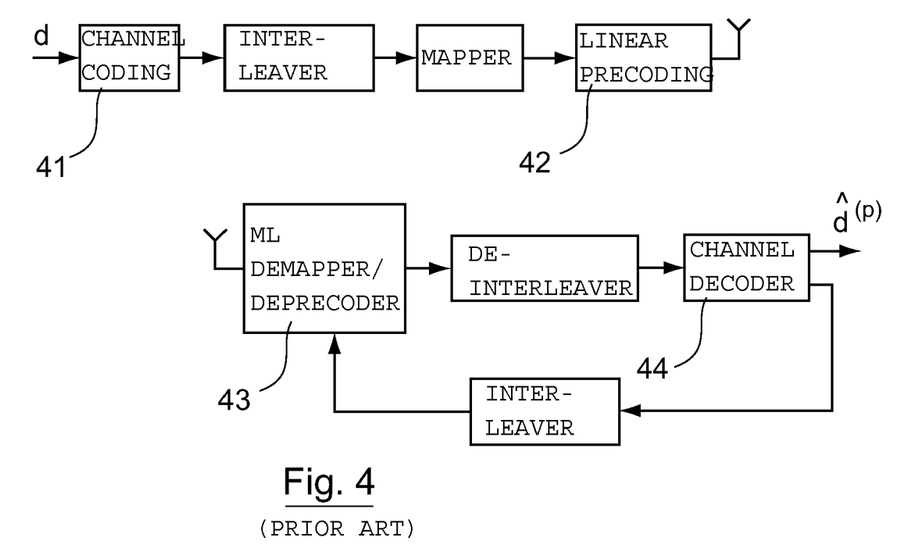

Z. Wang, S. Zhou and G. B. Giannakis in "Joint coding-precoding with low complexity turbo-decoding" (*IEEE transactions on wireless communications*, Vol. 3, No. 3, May 2004) have also presented an iterative receiver for a system that combines channel coding 41 and linear precoding 42 in sending or transmit mode as illustrated in FIG. 4. The receiver is based on an exchange of extrinsic information between a de-precoder associated with a maximum likelihood type of demapper 43 and a channel decoder 44.

These two iterative systems enable the joint performance of the de-precoding and the channel decoding within an iterative loop so as to approach optimum performance.

However, one drawback of these prior art iterative techniques is their complexity of implementation, owing to the use of a maximum likelihood type of algorithm at reception. Indeed, the complexity of such algorithms is exponentially proportional to the order of the modulation and the size of the precoding (or of the precoding matrices).

Other techniques for the reception of a signal having undergone a channel coding and a linear precoding before being sent are also known.

However, these techniques generally do not enable the interference due to the precoding, and as well as the interference due to channel coding or again to space-time coding to be eliminated, or at least reduced, with acceptable complexity.

SUMMARY OF THE INVENTION

The goal of an embodiment of the invention especially is to overcome these drawbacks of the prior art.

More specifically, it is a goal of an embodiment of the invention to provide a technique for the reception of a signal in a system comprising at least one channel coding and one linear precoding in sending mode.

It is another goal of an embodiment of the invention to propose the technique of this kind that is efficient and simple to implement.

In particular, it is a goal of an embodiment of the invention to provide a technique of linear complexity, thus enabling the use of large-sized precoding matrices.

It is yet another goal of an embodiment of the invention to propose a technique enabling the elimination, or at least the reduction, of the vestigial interference after de-precoding.

It is yet another goal of an embodiment of the invention to provide a technique of this kind that enables the joint performance of de-precoding, equalization and channel decoding within a same iterative loop.

These goals, and as well as others that shall appear here below, are attained by means of a method for the reception of a data signal which, before being sent, has undergone a linear precoding by means of a unitary precoding matrix, and a channel coding.

According to an embodiment of the invention, such a method comprises at least one iteration to improve an estimation of the received signal as a function of the received signal and of a preceding estimation of the received signal. The iteration of improvement comprises the following steps:
  the estimation of the interference, due especially to the linear precoding and affecting the received signal, as a function of the preceding estimation so as to obtain an estimated interference;
  the subtraction of said estimated interference from the preliminarily filtered and de-precoded received signal, so as to obtain an improved signal;
  the equalization of said improved signal, delivering an equalized signal;
  the estimation of the received signal, delivering an estimation of the received signal.

Thus, an embodiment of the invention is based on a wholly novel and inventive approach to the reception of a signal in a system comprising a channel-coding step and a linear precoding step in sending mode, in a context of transmission with one or more inputs in sending mode and one or more outputs in reception mode. Indeed, the invention can be applied to wire communications (whatever the medium of transmission, for example metal or optical carriers) and as well as to wireless communications.

It shall be recalled that here and throughout the rest of the document, the term "de-precoding" refers to an operation that is the reverse of the precoding operation performed in sending mode.

Indeed, the use of linear precoding in sending mode provides for improved performance in reception, since it gives gain in diversity. However, this precoding introduces interference that has to be eliminated at reception.

An embodiment of the invention thus proposes the reconstruction, at reception, of this interference during a step for estimation of the interference, and then the subtraction of this interference from the received signal to obtain an improved signal.

This step of interference estimation is done iteratively in taking account of a preceding estimation.

The improved signal is then equalized and estimated. This estimation of the signal than serves for the next iteration of improvement.

The receiver thus used is simpler to implement, since it does not use any maximum likelihood type of algorithm. It thus enables the use, in sending mode, of larger-sized precoding matrices, so as to obtain improved transmission performance at reception.

Thus, the proposed technique enables the joint performance, while preserving a receiver with linear complexity, of an equalization and de-precoding step and a channel-decoding step in the case of a MIMO transmission, and/or a space-time decoding and de-precoding step and a channel-decoding step, in the case of the implementation of space-time codes.

Advantageously, the interference estimation step implements a multiplication of said preceding estimation by an interference matrix taking account especially of a matrix that is the conjugate transpose of a matrix representing the transmission channel of said received signal and a matrix that is the conjugate transpose of said precoding matrix.

The matrix representing the transmission channel, also called a channel equivalent matrix, may take account especially of the space and/or time multiplexing implemented at sending. This matrix is diagonal in the case of a SISO system, and full in the case of a MIMO system.

This matrix may also be a block diagonal matrix.

In a MIMO type system, it takes account especially of inter-symbol interference due to the different paths in the propagation channel.

Preferably, the filtering of the received signal is implemented by multiplication of said received signal by a filtering matrix that is the conjugate transpose of a matrix representing especially the transmission channel.

According to an advantageous embodiment, the preceding estimation is delivered by the preceding iteration for all the iterations except the first one, and by a step of preliminary estimation for the first iteration.

The first iteration does not necessitate knowledge of a preceding estimation in order to be implemented. It involves an initialization step.

In particular, according to a first alternative embodiment, this first iteration implements a preliminary estimation step comprising the following steps:
  global equalization by multiplication of said received signal by a diagonalized global equalization matrix, representing the transmission channel of said received signal and said precoding matrix;
  estimation of said received signal delivering an estimation of the received signal.

According to a second alternative embodiment, the first iteration implements a step of preliminary estimation comprising the following steps:
  channel equalization by multiplication of said received signal by a matrix that is the conjugate transpose of a matrix representing the transmission channel of said received signal, delivering an equalized signal;
  de-precoding, by multiplication of said equalized signal by a matrix that is the conjugate transpose of said precoding matrix;
  estimation of said received signal, delivering an estimation of the received signal.

Advantageously, at least one of said steps of estimation of the received signal delivers, firstly, a binary estimation of said received signal and, secondly, a weighted estimation of said received signal (or soft estimation), said weighted estimation being used for the following iteration if it exists.

In particular, said steps of estimation comprise at least some of the following operations:
  mapping;
  de-interleaving;
  channel decoding;

re-interleaving;
soft mapping.

The term "mapping" is understood here to mean the conversion of binary elements into complex symbols.

According to one advantageous embodiment, the received signal is sent by and/or received on at least two antennas.

An embodiment of the invention can thus be applied to MIMO systems.

In particular, the received signal may have undergone a space-time coding before being sent, and the method may implement a channel decoding by means of a full matrix.

Preferably, for at least one iteration, the method implements a channel estimation taking account of at least one of the preceding estimations.

Thus, the estimation of the signal received at each iteration enables especially the estimation of the propagation channel.

An embodiment of the invention can also be applied advantageously to MC-CDMA type of multi-user systems.

In such a system, the interference-estimation step necessitates knowledge of the preceding estimation of each of the users. Again, the preceding estimation of each of the users is given by the preceding iteration.

An embodiment of the invention also relates to a reception device implementing the above-described method.

According to an embodiment of the invention, such a device comprises means to improve an estimation of the received signal, as a function of said received signal and a preceding estimation of said received signal, implementing the following at least once, in the form of an iteration:
means for the estimation of the interference, due especially to said linear precoding and affecting said received signal, as a function of the preceding estimation so as to obtain an estimated interference;
means for the subtraction of said estimated interference from said preliminarily filtered and de-precoded received signal, so as to obtain an improved signal;
means for the equalization of said improved signal, delivering an equalized signal;
means for the estimation of said received signal, delivering an estimation of the received signal.

An embodiment of the invention also relates to a computer program product implementing a method of reception as described here above.

BRIEF DESCRIPTION OF THE DRAWINGS

Other characteristics and advantages of the invention shall appear more clearly from the following description of a preferred embodiment, given by way of a simple, illustrative and non-exhaustive example, and from the appended drawings, of which.

DETAILED DESCRIPTION OF THE ILLUSTRATIVE EMBODIMENTS

The general principle of the invention is based on an iterative technique for the reception of a signal that has undergone a channel coding step and a linear precoding step before being sent, the technique implementing an iterative estimation of the interference generated by the channel coding and the precoding. The estimated interference, reconstructed from a preceding estimation, is then subtracted from the received signal so as to eliminate its contribution.

Figure 5:
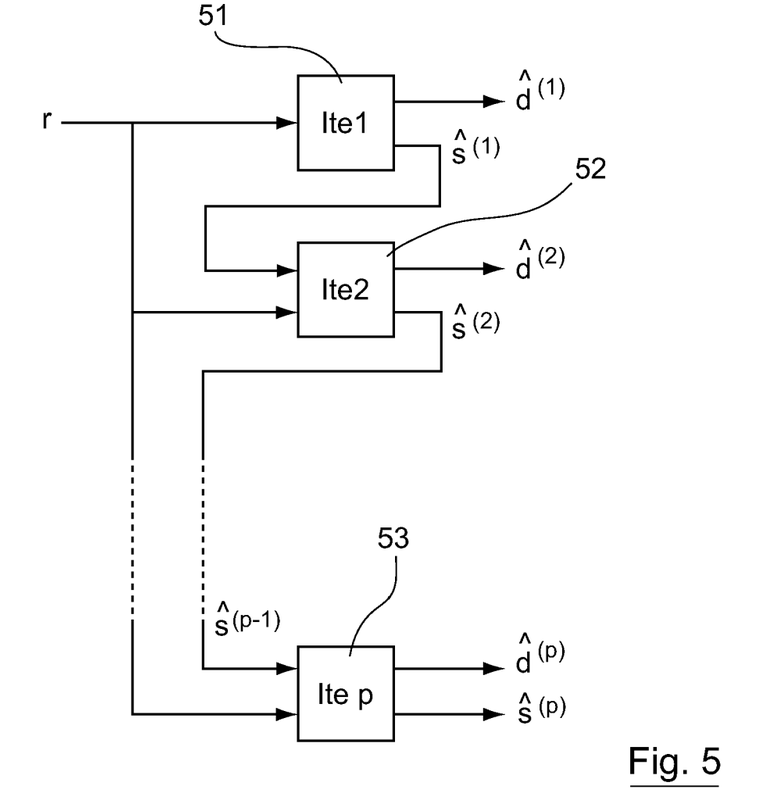
FIG. 5 illustrates the general principle of the iterative reception technique according to the invention.

As shown in FIG. 5, a receiver implementing a reception method of this kind comprises a first preliminary estimation module 51, enabling the delivery of a first estimation, and (p−1) elementary modules (52, 53), enabling the improvement of the estimation of the received signal at each iteration.

In particular, the following notations and definitions are used in the rest of this document:
d vector of bits sent;
$\Theta$ precoding matrix;
H matrix of the channel;
$G=\Theta^H \cdot H^H \cdot H \cdot \Theta$ global matrix;
$J=G-\text{diag}(G)$ interference matrix;
$\hat{s}^{(p)}$ weighted (soft) estimation at the iteration p of the received signal;
$\hat{d}^{(p)}$ binary (hard) estimation at the iteration p of the received signal;
r received signal;
σ variance of the noise.

Thus the signal d is considered to have been sent after linear precoding and channel coding. A linear precoding of this kind implements especially a matrix product of the vectors of the signal to be sent by the linear precoding matrix $\Theta$.

At reception, the received signal r enters the first estimation module Ite1 51, corresponding to the first iteration, implementing a preliminary estimation step.

In this preferred embodiment, this preliminary estimation step, in the course of a first iteration, delivers firstly a binary estimation $\hat{d}^{(1)}$ of the received signal and, secondly, a weighted estimation $\hat{s}^{(1)}$ of the received signal. The binary estimation actually corresponds to a hard decision on the bits of the estimated signal while the weighted estimation corresponds to a soft estimation of these same bits.

The weighted estimation $\hat{s}^{(1)}$ of the received signal is then used in the elementary module Ite2 52, during a second iteration.

This elementary module Ite2 52 takes account of the received signal r and the previous weighted estimation $\hat{s}^{(1)}$ to deliver, in its turn, an estimation of the received signal comprising, firstly, a hard estimation $\hat{d}^{(2)}$ of the received signal and, secondly, a soft estimation $\hat{s}^{(2)}$ of the received signal.

This operation is reiterated p times. Thus, at the end of the iteration p−1, a weighted estimation $\hat{s}^{(p-1)}$ of the received signal is obtained and can be reinjected into the last elementary module Itep 53.

As above, this elementary module Itep 53 takes account of the received signal r and the previous weighted estimation $\hat{s}^{(p-1)}$ to deliver an estimation of the received signal, comprising a hard estimation $\hat{d}^{(p)}$ and a soft estimation $\hat{s}^{(p)}$ of the received signal.

By thus reinjecting the previous weighted estimation into each of the iterations, an estimated signal of better quality is obtained, the interference due in particular to the channel coding and to the linear precoding being eliminated or at least reduced.

Figure 6A:
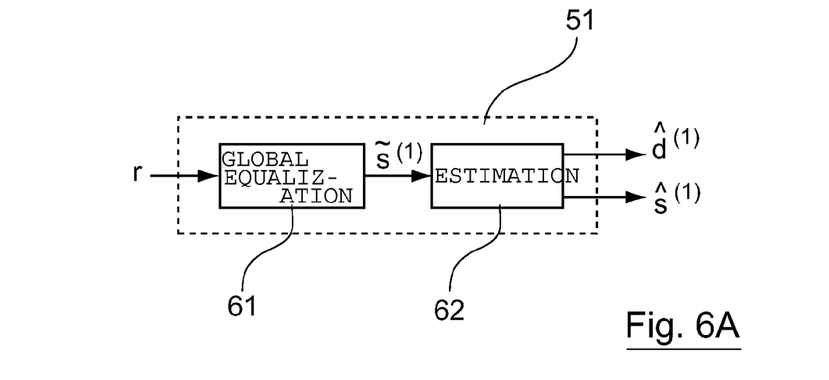
FIGS. 6A and 6B present two alternative modes of implementation of the preliminarily estimation step of FIG. 5.
Figure 6B:
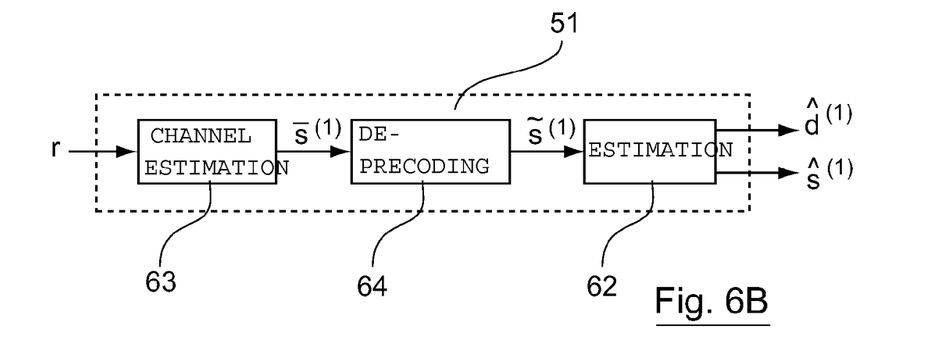

Referring now to FIGS. 6A and 6B, we present two alternative embodiments of the first estimation module Ite1 51.

According to a first variant, illustrated in FIG. 6A, the preliminary estimation step implements a sub-step 61 for the total equalization of the received signal r, followed by a sub-step for the estimation 62 of the received signal.

The equalization sub-step 61 implements especially a multiplication of the received signal r by a global equalization matrix G that it is sought to diagonalize, taking account at least of the matrix of the channel H and of the precoding matrix $\Theta$ used at sending. This equalization sub-step 61 delivers an equalized de-pre-coded signal $\tilde{s}^{(1)}$:

$$\tilde{s}^{(1)} = [(G+\sigma^2 I)^{-1} \cdot \Theta^H \cdot H^H] \cdot r$$

According to the preferred embodiment described here, it shall be considered especially that $G = \Theta^H \cdot H^H \cdot H \cdot \Theta$, or $^H$ corresponds to a conjugate transpose operation.

The equalized de-pre-coded signal $\tilde{s}^{(1)}$ is then estimated during the sub-step 62 of estimation of the received signal. This estimation especially delivers both a binary estimation $\hat{d}^{(1)}$ of the received signal, corresponding to the estimated binary signal, and a weighted estimation $\hat{s}^{(1)}$ of the received signal, corresponding to the estimated weighted signal.

According to a second alternative embodiment of the first estimation module Ite1 51, illustrated in FIG. 6B, the preliminary estimation step implements a channel equalization sub-step 63, followed by a de-precoding step 64, and then the sub-step 62 of estimation of the received signal presented in the first alternative embodiment.

The channel equalization sub-step 63 implements especially a multiplication of the received signal r by a matrix taking account of the channel matrix H, and especially of the noise, delivering an equalized signal $\bar{s}^{(1)}$:

$$\bar{s}^{(1)} = [(H^H H + \sigma^2 I)^{-1} \cdot H^H] \cdot r$$

The equalized signal $\bar{s}^{(1)}$ is then de-precoded during the de-precoding sub-step 64, by multiplication with the matrix $\Theta^H$, corresponding to the matrix that is the conjugate transpose of the precoding matrix $\Theta$ used when sending. Thus, an equalized de-precoded signal $\tilde{s}^{(1)}$ is obtained such that:

$$\tilde{s}^{(1)} = \Theta^H \cdot \bar{s}^{(1)}$$

Again, the equalized de-precoded signal $\tilde{s}^{(1)}$ is estimated during the sub-step 62 of estimation of the received signal, delivering a binary estimation $\hat{d}^{(1)}$ and a weighted estimation $\hat{s}^{(1)}$ of the received signal.

These two alternative embodiments show comparative performance. However, the second alternative embodiment remains simpler to implement.

It can thus be noted that, in the case of a SISO ("Single Input Single Output") transmission, the channel matrix H is a diagonal matrix. The inversion of the matrix is then reduced to a scalar inversion. In the case of a MIMO transmission, the channel matrix H is a full matrix.

Furthermore, since the precoding matrix $\Theta$ is unitary, the transpose and conjugate precoding matrix $\Theta^H$ corresponds to the matrix $\Theta^{-1}$, which is the inverse of the precoding matrix $\Theta$.

Figure 7:
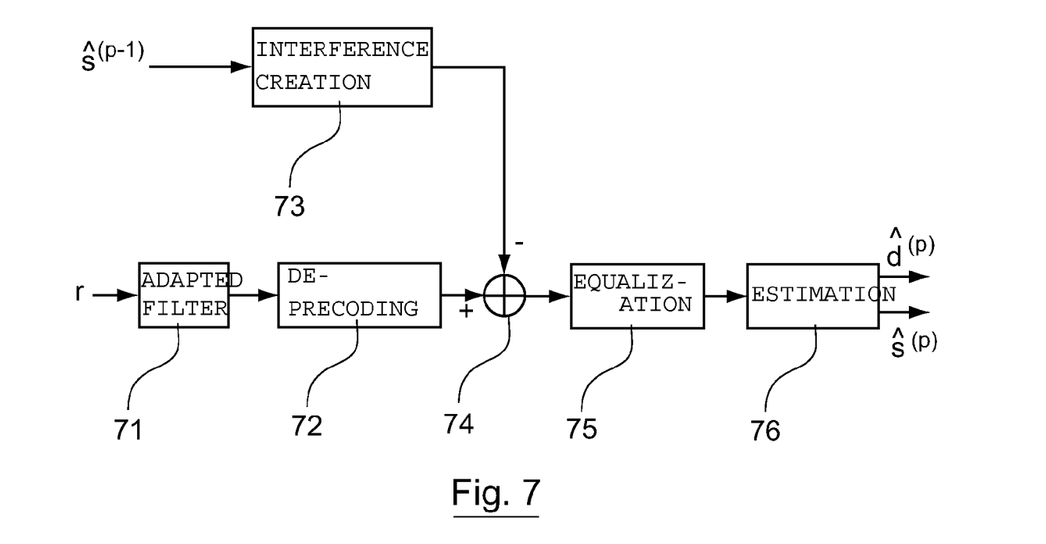
FIG. 7 presents a more detailed view of an improvement iteration of FIG. 5.

Referring now to FIG. 7, we present an iteration of improvement implemented in an elementary module (52, 53).

As described here above with reference to FIG. 5, each elementary module presents, at input, the received signal r and a weighted estimation delivered by the preceding elementary module.

Thus, at the iteration p, the elementary module Itep 53 has the received signal r and the weighted estimation $\hat{s}^{(p-1)}$ at input.

It may be recalled that the first estimation is given by the first estimation module Ite1 51, during a preliminary estimation step.

The received signal r is first of all filtered during a filtering step 71, delivering a filtered signal. This step is equivalent to multiplying the received signal r by the conjugate transpose matrix of the channel $H^H$.

It can be seen that the channel matrix is a diagonal matrix in the case of a SISO system, and a full matrix in the case of a MIMO system. This notion of equivalent channel matrix also includes a possible space-time coding of the signal sent and, especially, a block coding.

The filtered signal is then de-precoded, during a de-precoding step 72, to form a de-precoded signal. To do this, the matrix $\Theta^H$, corresponding to the matrix that is the conjugate transpose of the precoding matrix $\Theta$ used in sending mode, is applied to the filtered signal.

The elementary module Itep 53 also implements a step 73 for the estimation of interference, due especially to the channel coding and to the linear precoding.

This interference estimation step 73 takes account of a preceding estimation, namely the weighted estimation $\hat{s}^{(p-1)}$ for the iteration p, and implements a multiplication of the preceding estimation by an interference matrix J.

This interference matrix J takes account at least of the matrix $H^H$ that is the conjugate transpose of the channel matrix H and of the matrix $\Theta^H$ that is the conjugate transpose of the precoding matrix $\Theta$.

We consider especially $J = G - diag(G)$, with $G = \Theta^H \cdot H^H \cdot H \cdot \Theta$.

This interference, once estimated during the step 73, is then subtracted from the de-precoded signal, during a subtraction step 74, delivering an improved signal.

This improved signal is then equalized by multiplication of the improved signal by a matrix taking account of the propagation channel and especially of the noise and of the precoding $(diag(G) + \sigma^2 I)^{-1}$ during an equalization step 75. The equalized signal is then estimated during an estimation step 76.

In particular, this estimation step 76 delivers both a hard estimation $\hat{d}^{(p)}$ of the received signal, corresponding to the binary estimated signal and a soft estimation $\hat{s}^{(p)}$ of the received signal, corresponding to the estimated, weighted signal.

It can be seen that the estimation step 76 may also implement sub-steps of mapping, de-interleaving, channel decoding, re-interleaving or again soft mapping.

It may be recalled that the term "mapping" is understood here to mean the conversion of binary elements into complex symbols.

The estimation of the binary signal and/or of the weighted signal at each iteration also enables the estimation of the transmission channel. Thus, in taking account of the preceding estimations of the preceding iterations, the estimation of the channel may be improved.

The reception method presented may be implemented especially in MIMO type space multiplexing systems and/or in time multiplexing systems. The channel matrix H is then chosen so as to represent the different MIMO sub-channels and/or space-time coding.

Thus, a reception method of this kind may be implemented in systems having generalized space-time codes ("LD codes") capable of including both the principle of space-time coding and that of space multiplexing. The channel matrix H considered then represents both space-time coding and space multiplexing.

The invention considered may also be implemented in a multiple-user system of the MC-CDMA type.

Figure 10A:
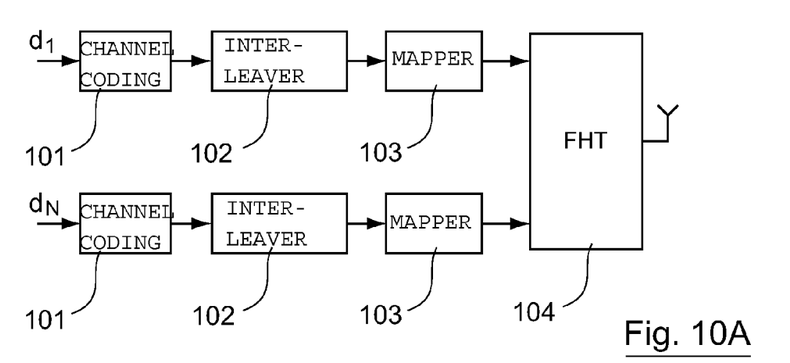
FIGS. 10A, 10B and 10C illustrate the application of the iterative method of FIG. 5 to a multiple-user system.

Thus, in sending mode, as illustrated in FIG. 10A, the sending or transmit device comprises a channel coder 101, an interleaver 102 and a mapper 103, used to convert the binary elements into symbols, for each user 1 to N.

The signals coming from the different users are then multiplexed in a step 104, implementing a Fast Hadamard Transform (FHT), well known to those skilled in the art.

At reception, the iterative process implemented is substantially identical to the process described in detail with reference to FIGS. 5 to 7.

Figure 10B:
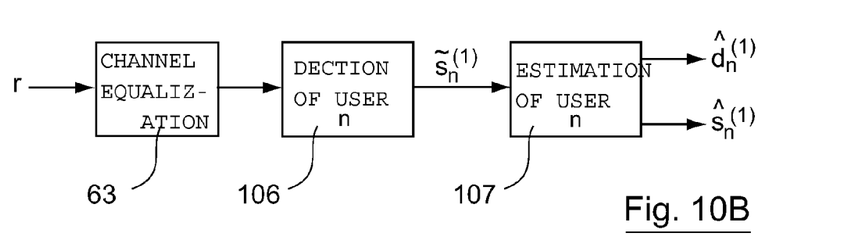

As illustrated in FIG. 10B, the preliminary estimation step for each of the N users is implemented in a first estimation module, and comprises a channel equalization sub-step 63, followed by a de-precoding sub-step 106, and then a sub-step 107 of estimation of the signal received by the user n. In the case of a MC-CDMA system, the de-precoding sub-step 106 corresponds to a step of detection of a user n (for n as an integer and $1 \leq n \leq N$).

The channel equalization sub-step 63 implements especially a multiplication of the received signal r by a matrix taking account of the channel matrix H, and especially of the noise, delivering an equalized signal $\bar{s}^{(1)}$:

$$\bar{s}^{(1)} = [(H^H H + \sigma^2 I)^{-1} \cdot H^H] \cdot r$$

The equalized signal $\bar{s}^{(1)}$ is then multiplied by the n-th line of the matrix $\Theta^H$ corresponding to the user n, referenced $(\Theta^H)_n$, the matrix $\Theta^H$ corresponding to the matrix that is the conjugate transpose of a precoding matrix $\Theta$ used when sending. Thus, an equalized de-precoded signal $\tilde{s}_n^{(1)}$, is obtained, such that:

$$\tilde{s}_n^{(1)} = (\Theta^H)_n \cdot \bar{s}^{(1)}$$

The equalized de-precoded signal $\tilde{s}_n^{(1)}$ is then estimated during the sub-step 107 for the estimation of the received signal, delivering a binary estimation $\hat{d}_n^{(1)}$ and a weighted estimation $\hat{s}_n^{(1)}$ of the signal received by the user n.

Figure 10C:
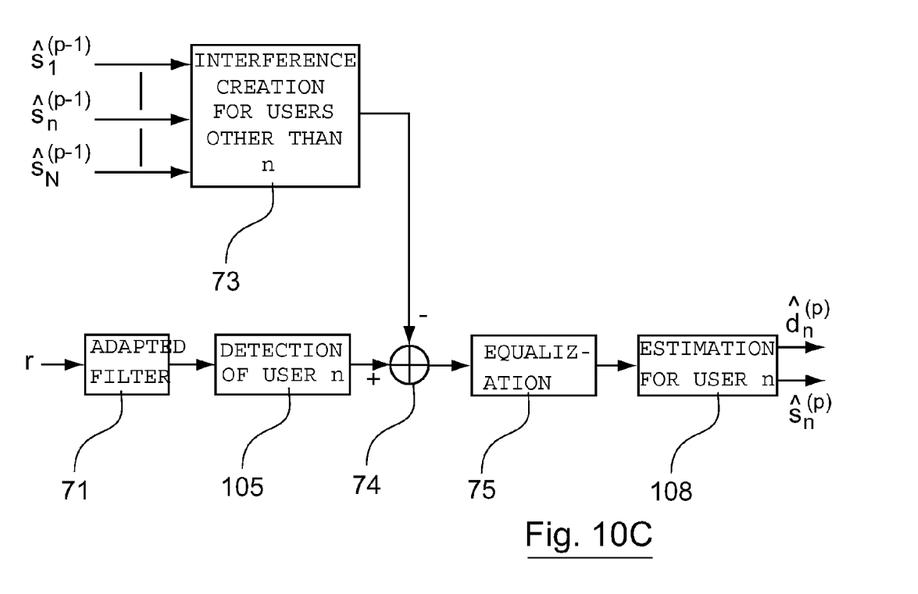

As illustrated in FIG. 10C, and as described here above with reference to FIG. 5, each elementary module has, at input, the received signal r and a weighted estimation delivered by the preceding elementary module. FIG. 10C illustrates an elementary module p of this kind for the user n.

The received signal r is first of all filtered during a step 71. In the case of a multi-user system, the de-precoding step 72 of FIG. 7 is replaced by a single-user detection step 105 enabling an estimation to be made independently for each user. This detection step 105 implements a multiplication of the received signal filtered by the n-th line of the de-precoding matrix $\Theta^H$ corresponding to the user n, referenced $(\Theta^H)_n$, and gives a de-precoded signal.

In the case of a multi-user system, the preceding weighted estimation p−1 entering an elementary module p comprises the contribution of the preceding estimations p−1 for all the users (N users in this example). Thus, the interference matrix J implemented enables the reconstruction of the interference generated by users other than the user n. At the iteration p, this matrix takes account especially of the preceding weighted estimations $\hat{s}_1^{(p-1)}, \ldots, \hat{s}_n^{(p-1)}, \ldots, \hat{s}_N^{(p-1)}$, given by the preceding iteration p−1.

This interference, once estimated during the step 73, is then subtracted from the de-precoded signal during a step 74, to give an improved signal. This improved signal is then equalized, and then estimated during an estimation step 108.

This estimation step 108 delivers especially a binary estimation $\hat{d}_n^{(p)}$ of the signal received by the user n, corresponding to the estimated binary signal, and a weighted estimation $\hat{s}_n^{(p)}$ of the signal received by the user n, corresponding to the estimated weighted signal.

An iterative technique of this kind can also be used in an MC-CDMA system implementing several transmit and/or receiver antennas and/or a space-time coding operation.

The invention can also be applied to systems implementing trellis-coded modulation (TCM).

The performance of the iterative method according to the invention can also be improved by the implementation of automatic gain control (AGC), before or after the equalization step (61, 63) in a first estimation module and/or during iterations in at least one of the elementary modules.

The AGC is aimed in particular at normalizing the energy from the signal to make it unitary, and at minimizing the propagation of errors in the iterations.

Thus a signal $x_k$ at input of such an AGC, is converted into a signal $y_k$ as follows:

$$y_k = \alpha_k \cdot x_k$$

The coefficient $\alpha_k$ can be determined especially by:

$$\begin{cases} G_k = G_{k-1} + \mu(1 - |y_k|^2) \\ \alpha_k = \sqrt{G_k} \end{cases}$$

where $\mu$ is the adaptation step.

Referring now to FIGS. 8A, 8B, 8C and 8D, different modes of implementing such a reception method are presented.

For these different modes proposed, the precoding matrix $\Theta$ is considered to be a block matrix of the form:

$$\Theta_L = \sqrt{\frac{2}{L}} \cdot \begin{bmatrix} \Theta_{L/2} & \Theta_{L/2} \\ \Theta_{L/2} & -\Theta_{L/2} \end{bmatrix} \text{ with}$$

$$\Theta_2 = \begin{bmatrix} e^{j\vartheta_1}\cos\eta & e^{j\vartheta_2}\sin\eta \\ -e^{-j\vartheta_2}\sin\eta & e^{-j\vartheta_1}\cos\eta \end{bmatrix}$$

and $$\eta = \frac{\pi}{4} + k\frac{\pi}{2}, \vartheta_2 = \vartheta_1 - \frac{\pi}{2},$$

and for i∈[1,2], $$\vartheta_i = \frac{\pi}{4} + k'\frac{\pi}{2}$$

where k, k' are relative integers.

The parameters $\eta$, $\Theta_1$ and $\Theta_2$ are optimized in particular if:

$\eta=\pi/4$ $\Theta_1=5\pi/4$ $\Theta_2=3\pi/4$

It is considered here, and for the different embodiments described here below, that the transmission system comprises, on the sender side, a channel coding and a precoding with a length L, implemented from the precoding matrix $\Theta_L$.

H again denotes the equivalent channel matrix and r the received signal, these two parameters being used by the iterative system.

Figure 8A:
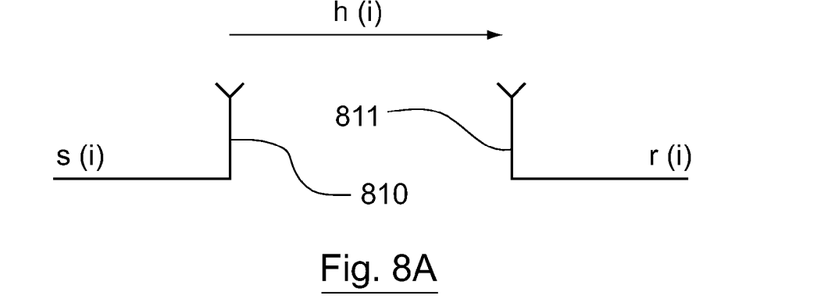
FIGS. 8A, 8B, 8C and 8D show different embodiments of the invention in a multiple-antenna context.

Thus FIG. 8A shows a SISO type system, comprising a single sending or transmit antenna 810 and a single receiver antenna 811. At the symbol time i, the transmit antenna 810 sends a symbol s(i), through a propagation channel represented by the coefficient h(i).

The received symbol r(i), affected by the propagation channel has the form: r(i)=s(i)*h(i).

The equivalent channel matrix H used by the iterative receiver is then a diagonal matrix (because the system is of the SISO type), having the form:

$$H = \begin{bmatrix} h(i) & 0 & 0 & 0 \\ 0 & h(i+1) & 0 & 0 \\ \vdots & 0 & \ddots & \vdots \\ 0 & 0 & \cdots & h(i+L-1) \end{bmatrix}.$$

Figure 8B:
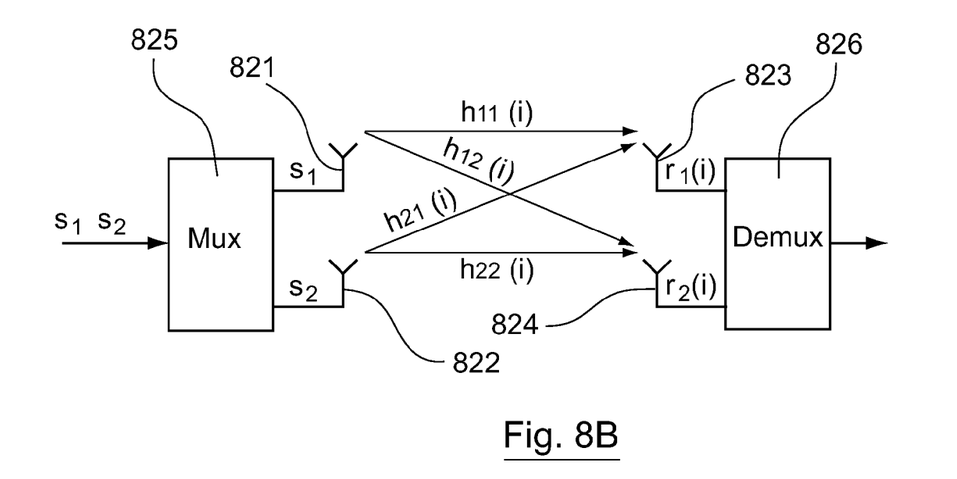

A MIMO type system is now presented in FIG. 8B. This system has two transmit antennas (821, 822) and two receiver antennas (823, 824). The system in this case has, on the sending side, a multiplexer 825 enabling spatial multiplexing and, on the reception side, a demultiplexer 826. The channel matrix H is also chosen so as to represent spatial multiplexing (namely the different sub-channels of the MIMO sub-system).

$h_{mn}(i)$ denotes the coefficient of the channel between the mth transmit antenna and the nth receiver antenna at the symbol time i.

Thus, at the symbol time i, two symbols $s_1(i)$ and $s_2(i)$ are sent simultaneously on the two transmit antennas (821, 822). The spatial multiplexing can also be represented by the following table, in considering Ts to be a symbol time:

|  | Antenna 821 | Antenna 822 |
| --- | --- | --- |
| T = iTs | $s_1$ | $s_2$ |

The equivalent channel matrix H used by the iterative receiver then has the form:

$$H = \begin{bmatrix} h_{11}(i) & h_{12}(i) & 0 & \cdots & 0 \\ h_{21}(i) & h_{22}(i) & 0 & \cdots & 0 \\ 0 & \ddots & \ddots & & \vdots \\ \vdots & \ddots & \ddots & h_{11}(i+L/2-1) & h_{12}(i+L/2-1) \\ 0 & 0 & \cdots & h_{21}(i+L/2-1) & h_{22}(i+L/2-1) \end{bmatrix},$$

with $H \in C^{L \times L}$

Figure 8C:
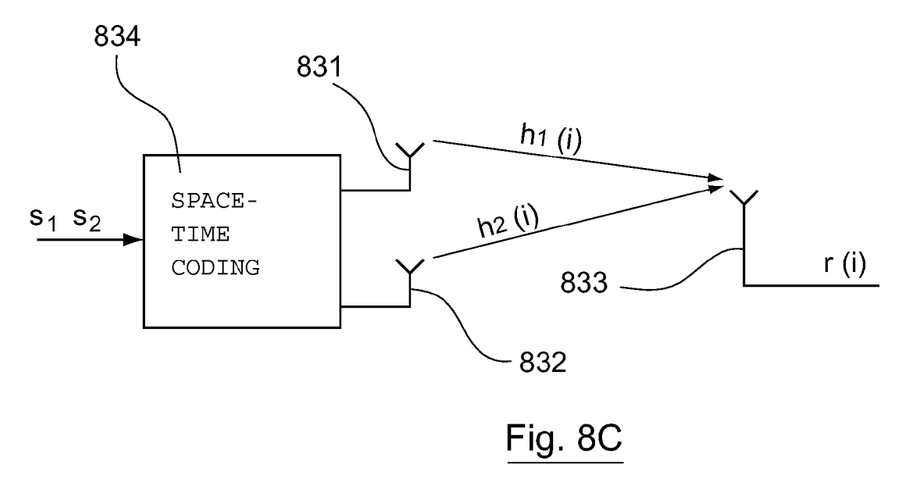
Figure 8D:
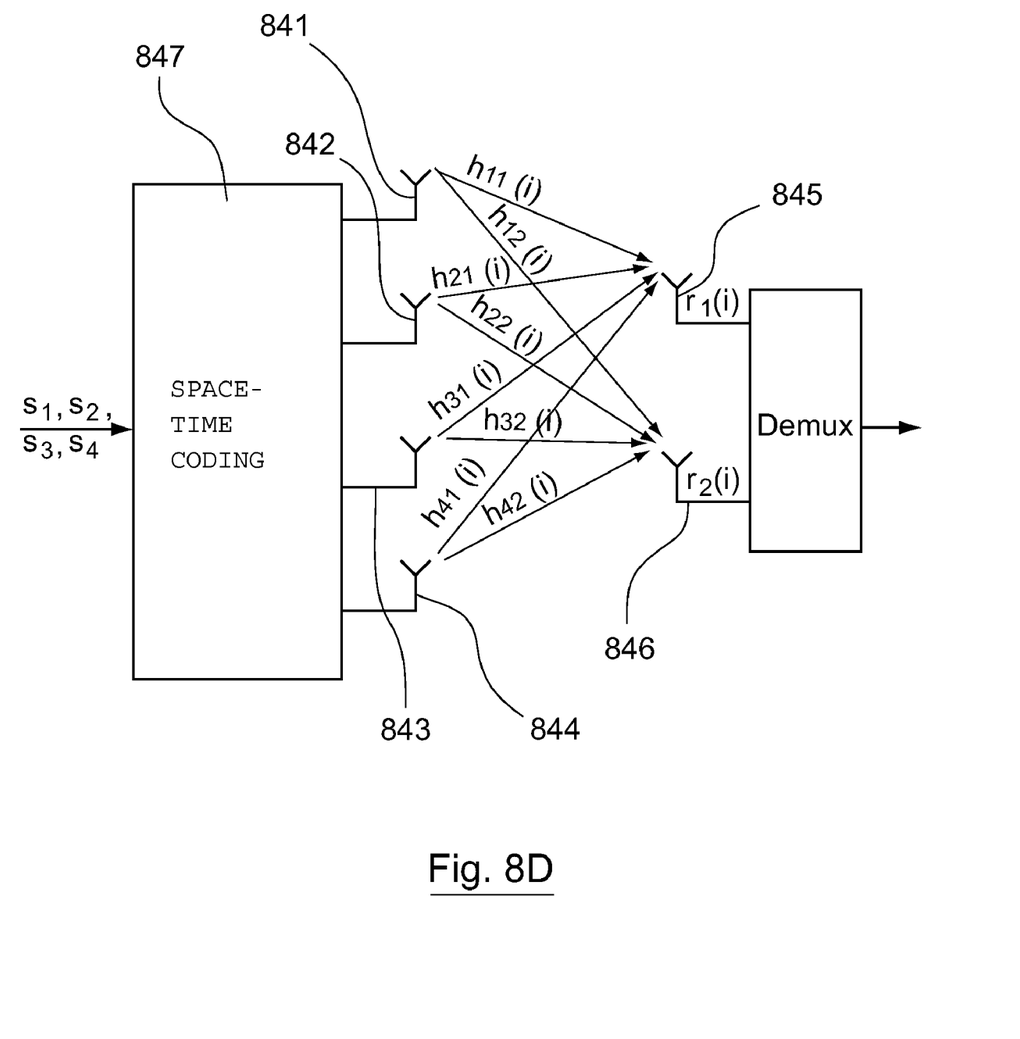

The vector r used in the iterative reception method corresponding to the received signal then has the form:

$r=[r_1(i)r_2(i) \ldots r_1(i+L/2-1)r_2(i+L/2-1)]^T$ with $r \in C^{L \times 1}$ We now take the case of a MISO system as shown in FIG. 8C.

This system has two transmit antennas (831, 832) and only one receiver antenna (833). On the sending side, the system also implements a space-time coding 834, for example of the Alamouti type.

$h_m(i)$ denotes the coefficient of the channel between the mth transmit antenna and the nth receiver antenna at the symbol time i. It is also assumed that the channel is constant on two consecutive symbol times, namely:

$$\begin{cases} h_1(i) = h_1(i+1) \\ et \\ h_2(i) = h_2(i+1) \end{cases} \quad i \in [\ldots, -4, -2, 0, 2, 4, \ldots]$$

The space-time coding can be represented in particular by the following table, in considering Ts to be a symbol time:

|  | Antenna 841 | Antenna 842 | Antenna 843 | Antenna 844 |
| --- | --- | --- | --- | --- |
| t = i Ts | $s_1$ | $s_2$ | $s_3$ | $s_4$ |
| t = (I + 1) Ts | $-s_2^*$ | $-s_1^*$ | $-s_4$ | $s_3^*$ |

The equivalent channel matrix H used by the iterative receiver then has the form:

$$H = \begin{bmatrix} H[i] & 0 & \cdots & 0 \\ 0 & H[i+2] & \ddots & 0 \\ \vdots & \ddots & \ddots & \vdots \\ 0 & 0 & \cdots & H\left[i+2\left(\frac{L}{4}-1\right)\right] \end{bmatrix}, H \in C^{L \times L}$$

with:

$$H[i] = \begin{bmatrix} h_{11}(i) & h_{21}(i) & h_{31}(i) & h_{41}(i) \\ h_{12}(i) & h_{22}(i) & h_{32}(i) & h_{42}(i) \\ h_{21}^*(i+1) & -h_{11}^*(i+1) & h_{41}^*(i+1) & -h_{31}^*(i+1) \\ h_{22}^*(i+1) & -h_{12}^*(i+1) & h_{42}^*(i+1) & -h_{32}^*(i+1) \end{bmatrix},$$

$H[i] \in C^{4 \times 4}$

The vector r used in the iterative reception method corresponding to the received signal then has the form:

$$r = \begin{bmatrix} r_1(i) & r_2(i) & r_1^*(i+1) & r_2^*(i+1) & \ldots \\ & r_1\left(i+\frac{L}{2}-2\right) & r_2\left(i+\frac{L}{2}-2\right) & r_1^*\left(i+\frac{L}{2}-1\right) & r_2^*\left(i+\frac{L}{2}-1\right) \end{bmatrix}^T$$

avec $r \in C^{L \times 1}$.

It can be seen, through these different embodiments, that the channel equivalent matrix can represents a space multiplexing and/or a time multiplexing. This channel matrix may also take account of other processing operations implemented in a sender, and take account of inter-symbol interference.

Figure 9A:
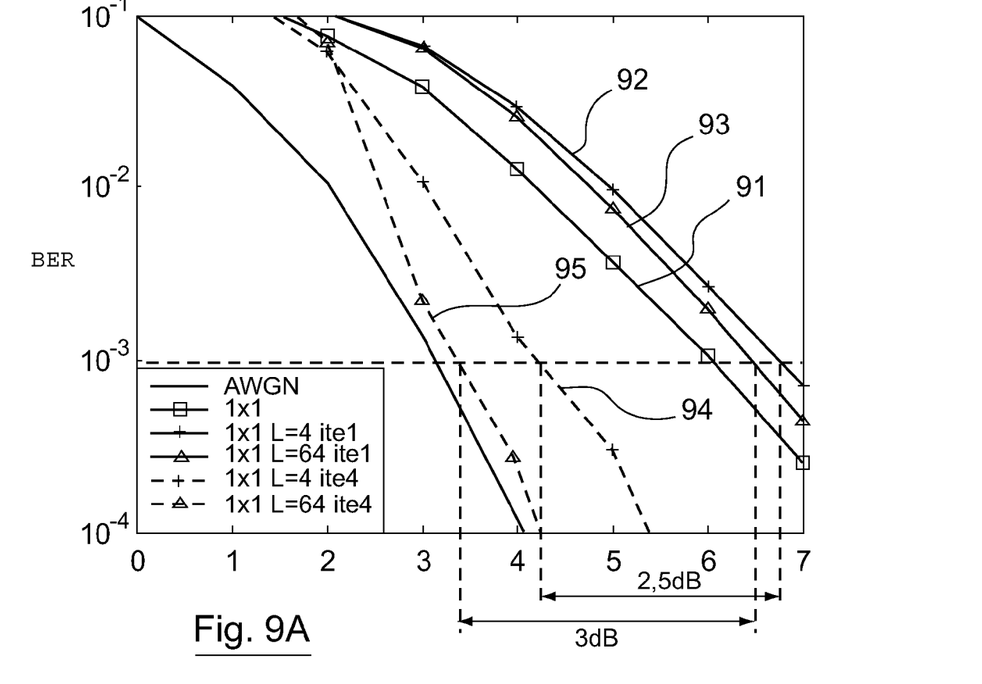
FIGS. 9A and 9B show the performance of the invention as compared with the prior art solutions for a SISO system and for a MIMO system.
Figure 9B:
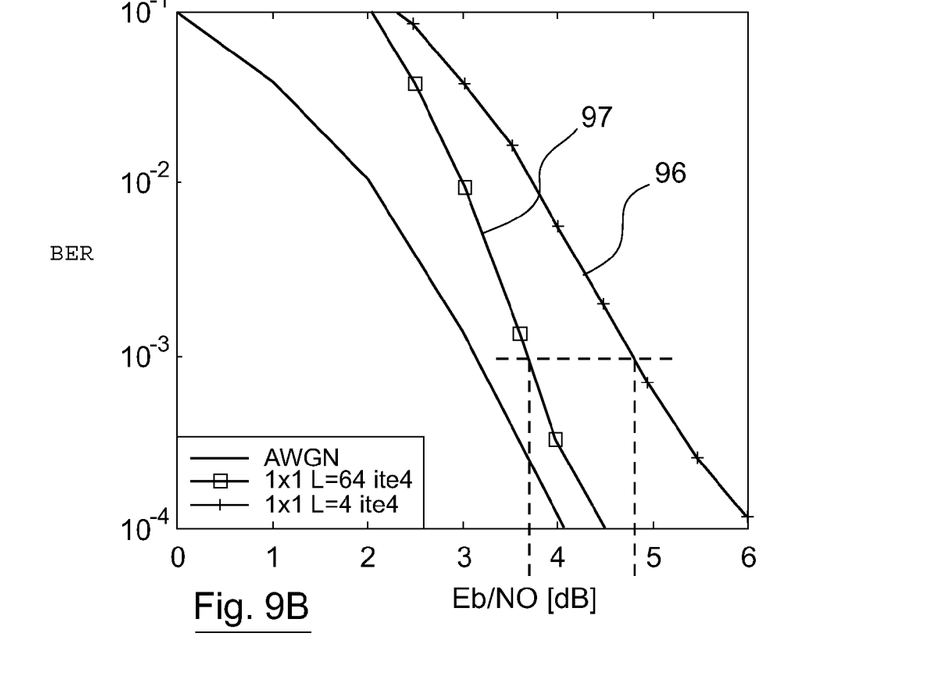

Referring now to FIGS. 9A and 9B, a description is given of the performance of the invention as compared with the prior art solutions for a SISO system (9A) and for a MIMO (9B) system.

The channel encoding used for these two systems is of a convolutional type, and has an efficiency R equal to ½, and a constraint length K equal to 5.

The curves of FIG. 9A correspond to a SISO having only one transmit antenna and only one receiver antenna as illustrated in FIG. 8A.

The curve 1×1, referenced 91, has a binary error rate (BER) as a function of the ratio Eb/N0 (corresponding to the ratio between the energy expended per transmitted bit and the spectral density of the white noise), for a prior art system without precoding, implementing a channel encoding.

The curves 1×1 L=4 ite1 and 1×1 L=64 ite1, respectively referenced 92 and 93, show the performance of a prior art system as presented by V. Le Nir, M. Hélard and R. Le Gouable, in "Technique de précodage et de codage espace-temps" (Space-time precoding and coding technique), patent application FR 02 16200, filed on 16 Dec. 2002 on behalf of the present applicant. Such a system does not implement an iterative reception method, and comprises a linear de-precoder at reception concatenated with the channel decoder, for a precoding length L=4 (curve 92) or L=64 (curve 93).

Finally, the curves 1×1 L=4 ite4 and 1×1 L=64 ite4, respectively referenced 94 and 95, present the performance of a system according to the invention, implementing an iterative reception method with four iterations.

Thus, a gain of about 2.5 dB can be seen between the curve 1×1 L=4 ite1 (92), which corresponds to the system implementing a single iteration and the curve 1×1 L=4 ite4 (94), which corresponds to a system implementing four iterations when the binary error rate (BER) is $10^{-3}$, with a pre-encoding length L=4.

A gain of about 3 dB is also seen between the curve 1×1 L=64 ite1 (93), which corresponds to the system implementing a single iteration and the curve 1×1 L=4 ite64 (95), which corresponds to a system implementing four iterations when the binary error rate (BER) is $10^{-3}$, with a precoding length L=64.

It can thus be seen that the reception performance is improved when the size of the pre-encoding increases and/or when the number of iterations increases.

The curves of FIG. 9B present the performance of a MIMO type spatial multiplexing system with four transmit antennas and four receiver antennas, implementing the reception method according to the invention.

This figure shows the curves 4×4 L=4 ite4 and 4×4 L=64 ite4, respectively referenced 96 and 97, corresponding to the implementation of an iterative reception method with four iterations for a precoding length L=4 (curve 96) or L=64 (curve 97).

It can be seen that the performance obtained for a precoding length L=64 (curve referenced 97) is substantially better than the performance corresponding to a precoding length L=4 (curve referenced 96).

Thus, a gain of about 1.5 dB is observed between these two curves, when the binary error rate (BER) is $10^{-3}$.

Thus, a system implementing the reception method of the invention shows very good performance, comparable to the performance obtained with a maximum likelihood type of detector at reception, while at the same time maintaining reduced complexity.

It will be noted that the invention is not limited to a purely hardware installation but that it can also be implemented in the form of a sequence of instructions of a computer program or any form combining a hardware part and a software part.

Should the invention be partially or totally implemented in software form, the corresponding sequence of instructions could be stored in a storage means that is detachable (such as for example a floppy disk, a CD-ROM or a DVD-ROM) or non-detachable, this storage means being partially or totally readable by a computer or a microprocessor.

Although the present invention has been described with reference to preferred embodiments, workers skilled in the art will recognize that changes may be made in form and detail without departing from the spirit and scope of the invention.

What is claimed is:

1. A method for the reception of a data signal which, before being sent, has undergone a linear precoding by means of a unitary precoding matrix, and a channel coding, wherein the method comprises:

at least one iteration to improve an estimation of the received data signal, as a function of said received data signal and of a preceding estimation of said received data signal, said iteration comprising the following steps:

an estimation of an interference, due at least to said linear precoding and affecting said received data signal, as a function of said preceding estimation so as to obtain an estimated interference, wherein said interference estimation step implements a multiplication of said preceding estimation by an interference matrix, wherein the interference matrix takes account of at least a matrix that is the conjugate transpose of a matrix representing the transmission channel of said received data signal and a matrix that is the conjugate transpose of said precoding matrix;

a subtraction of said estimated interference from a preliminarily filtered and inverse precoded received data signal, so as to obtain an improved signal;

an equalization of said improved signal, delivering an equalized received data signal; and an estimation of the data signal.

2. A reception method according to claim 1, wherein, in each of said iterations, said filtering of the received data signal is implemented by multiplication of said received data signal by a filtering matrix that is the conjugate transpose of a matrix representing at least the transmission channel.

3. A reception method according to claim 1, wherein said preceding estimation is delivered by the preceding iteration for all the iterations except for the first iteration, and by a step of preliminary estimation for the first iteration.

4. A reception method according to claim 3, wherein said preliminary estimation step comprises the following steps:

global equalization by multiplication of said received data signal by a diagonalized global equalization matrix, representing the transmission channel of said received data signal and said precoding matrix;

estimation of said received data signal delivering an estimation of the received data signal.

5. A reception method according to claim 3, wherein said preliminary estimation comprises the following steps:

channel equalization by multiplication of said received data signal by a matrix that is the conjugate transpose of a matrix representing the transmission channel of said received data signal, delivering an equalized received data signal;

de-precoding, by multiplication of said equalized received data signal by a matrix that is the conjugate transpose of said precoding matrix;

estimation of said equalized received data signal, delivering an estimation of the received data signal.

6. A reception method according to claim 1, wherein at least one of said steps of estimation of the received data signal delivers, firstly, a binary estimation of said received data signal and, secondly, a weighted estimation of said received data signal, said weighted estimation being used for the following iteration if it exists.

7. A reception method according to claim 1, wherein said steps of estimation comprise at least some of the following operations:
conversion of the bits into symbols or mapping;
de-interleaving;
channel decoding;
re-interleaving;
soft mapping.

8. A reception method according to claim 1, wherein said received data signal is sent by and/or received on at least two antennas.

9. A reception method according to claim 8, wherein said received data signal has undergone a space-time coding when sent, and wherein the method implements a channel decoding by means of a full matrix.

10. A method according to claim 2, wherein said filtering matrix takes account of the transmission channel and of said space-time coding.

11. A method according to claim 1, wherein, for at least one iteration, the method implements a channel estimation taking account of at least one of the preceding estimations.

12. A method according to claim 1, implemented in an MC-CDMA type of multi-user system.

13. A device for the reception of a data signal which, before being sent, has undergone a linear precoding by means of a unitary precoding matrix, and a channel coding, the device comprising:
means to improve an estimation of the received data signal iteratively, as a function of said received data signal and of a preceding estimation of said received data signal,
means for estimating an interference, due at least to said linear precoding and affecting said received data signal, as a function of the preceding estimation so as to obtain an estimated interference, wherein means for estimating an interference implements a multiplication of said preceding estimation by an interference matrix, wherein the interference matrix takes account of at least a matrix that is the conjugate transpose of a matrix representing the transmission channel of said received data signal and a matrix that is the conjugate transpose of said precoding matrix;
means for subtracting said estimated interference from a preliminarily filtered and inverse precoded received data signal, so as to obtain an improved signal;
means for equalizing said improved signal, delivering an equalized received data signal;
means for estimating said equalized received data signal, delivering an estimation of the received data signal.

14. A computer readable storage medium storing a set of machine executable instructions, said instructions being executable by a computer and adapted to implement a method for reception of a data signal which, before being sent, has undergone a linear precoding by means of a unitary precoding matrix, and a channel coding, wherein the method comprises:
at least one iteration to improve an estimation of the received data signal, as a function of said received data signal and of a preceding estimation of said received data signal, said iteration comprising the following steps:
an estimation of an interference, due at least to said linear precoding and affecting said received data signal, as a function of said preceding estimation so as to obtain an estimated interference, wherein said interference estimation step implements a multiplication of said preceding estimation by an interference matrix, wherein the interference matrix takes account of at least a matrix that is the conjugate transpose of a matrix representing the transmission channel of said received data signal and a matrix that is the conjugate transpose of said precoding matrix;
a subtraction of said estimated interference from a preliminarily filtered inverse precoded received data signal, so as to obtain an improved signal;
an equalization of said improved signal, delivering an equalized received data signal; and
an estimation of the data signal.

* * * * *